(12) United States Patent
Liu et al.

(10) Patent No.: US 7,814,773 B2
(45) Date of Patent: Oct. 19, 2010

(54) REFERENCE LEAK

(75) Inventors: Liang Liu, Beijing (CN); Shuai-Ping Ge, Beijing (CN); Zhao-Fu Hu, Beijing (CN); Bing-Chu Du, Beijing (CN); Cai-Lin Guo, Beijing (CN); Pi-Jin Chen, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 119 days.

(21) Appl. No.: 11/361,620

(22) Filed: Feb. 24, 2006

(65) Prior Publication Data

US 2006/0196245 A1    Sep. 7, 2006

(30) Foreign Application Priority Data

Mar. 3, 2005    (CN) .................. 2005 1 0033489

(51) Int. Cl.
*G01N 21/00* (2006.01)

(52) U.S. Cl. .................. 73/1.02; 73/1.01; 73/1.06; 73/40.7; 73/40; 73/31.06; 257/347; 257/48; 257/521; 438/18; 438/406; 438/48

(58) Field of Classification Search ............ 438/18, 438/406, 48, 49, 456; 73/40, 754, 31.06, 73/1.02; 257/48, 521, 352, 414, 253; 204/400
See application file for complete search history.

(56) References Cited

U.S. PATENT DOCUMENTS

| | | | | |
|---|---|---|---|---|
| 4,037,306 A | * | 7/1977 | Gutteridge et al. | 438/361 |
| 4,542,650 A | * | 9/1985 | Renken et al. | 73/196 |
| 4,851,078 A | * | 7/1989 | Short et al. | 438/406 |
| 4,874,500 A | * | 10/1989 | Madou et al. | 204/412 |
| 4,878,957 A | * | 11/1989 | Yamaguchi et al. | 148/33.3 |
| 4,975,390 A | * | 12/1990 | Fujii et al. | 438/53 |
| 5,388,443 A | * | 2/1995 | Manaka | 73/31.06 |
| 5,457,333 A | * | 10/1995 | Fukui | 257/253 |
| 5,632,854 A | * | 5/1997 | Mirza et al. | 438/53 |
| 5,846,392 A | * | 12/1998 | Knoll | 205/778 |
| 5,852,308 A | * | 12/1998 | Wood | 257/252 |
| 6,182,502 B1 | | 2/2001 | Schwegler et al. | |
| 6,265,222 B1 | * | 7/2001 | DiMeo et al. | 436/144 |

(Continued)

FOREIGN PATENT DOCUMENTS

WO    WO 2004083843 A1 *  9/2004

OTHER PUBLICATIONS

Michael Quirk & Julian Serda "Semiconductor Manufacturing Technology" 2001 Prentice Hall p. 507.*

*Primary Examiner*—David Vu
*Assistant Examiner*—Brandon Fox
(74) *Attorney, Agent, or Firm*—Jeffrey T. Knapp

(57) ABSTRACT

A reference leak (10) includes a first substrate (20), a second substrate (40) disposed and bonded on the first substrate, and predetermined numbers of leak channels (14) defined in at least one of the first and second substrates. Oblique walls of the leak channels are formed by crystal planes of the at least one of the first and second substrates, the oblique walls thereby being aligned according to such crystal planes. A method for making a reference leak is also provided.

18 Claims, 2 Drawing Sheets

U.S. PATENT DOCUMENTS 6,265,750 B1 * 7/2001 Feng et al. .................. 257/414
6,812,508 B2 * 11/2004 Fukumi ...................... 257/244
2003/0129809 A1 * 7/2003 Takyu et al. ................ 438/460
2006/0272942 A1 * 12/2006 Sirringhaus ................ 204/406

* cited by examiner

_US 7,814,773 B2_

REFERENCE LEAK

BACKGROUND

1. Technical Field

The invention relates generally to detecting instruments for use in detection of gas leaks, and more particularly to a reference leak.

2. Discussion of Related Art

In vacuum technology, detecting instruments such as leak detectors, e.g. helium mass spectrometer leak detectors, are essential, and reference leaks are necessary for periodic calibration of leak detectors. A reference leak generally has a constant leak rate for a specific gas under given conditions such as a specific temperature and a specific pressure, at the gas intake side. And a reference, with which the leak rate of a measured system can be known, is precisely given.

Conventional reference leaks can generally be classified into the three types: platinum wire-glass leaks, squeezed metal tube leaks, and silica membrane helium leaks. A leak rate of the platinum wire-glass leak is generally in the range from $10^{-6} \sim 10^{-8}$ torr·l/s. The platinum wire-glass leak is obtained by implanting a platinum wire into a glass body by way of a glass-to-metal unmatched sealing method. Due to a coefficient of thermal expansion of the platinum wire being unmatched with that of the glass body, a plurality of leak gaps are then defined at an interface between the platinum wire and the glass body. The platinum wire-glass leak is then obtained. However, during the manufacturing process of the platinum wire-glass type leak, the leak gaps' shapes, sizes, and numbers are randomly formed and therefore cannot be artificially controlled. A leak rate of the reference leak has to be calibrated by other reference calibration instruments after the reference leak is manufactured. Additionally, the leak rate of the reference leak is temperature sensitive. Specifically, the leak rate may vary due to a change of the number and distribution of the leak gaps as a result of a change in ambient temperature. This temperature dependence may cause uncertainties (i.e., potential for an increased margin of error) with respect to the leak rate of the platinum wire-glass leak.

The squeezed metal tube leak is generally obtained by punching a tube of an oxygen-free copper into a flattened piece by a hydraulic pressure device. The squeezed metal tube includes a plurality of leak gaps, the leak gaps functioning as leak channels for the gaps. A leak rate of the squeezed metal tube type reference leak is generally in the range from $10^{-6} \sim 10^{-8}$ torr·l/s. However, similar to the platinum wire-glass leak, shapes, sizes, and numbers of the leak gaps of the squeezed metal tube leak are also formed randomly, making such leak gaps unpredictable and therefore generally uncontrollable by artificial means.

The silica membrane helium leak is generally in a form of a blown bubble, which is typically a thin, spherical membrane formed of silica glass. The silica glass membrane is porous and allows helium (He) gas to pass therethrough while blocking other kinds of gases. Likewise, a leak rate of such a reference leak is unpredictable and has to be calibrated by other reference calibration instruments. The leak rate of the reference leak is also temperature sensitive.

Therefore, a heretofore unaddressed need exists in the industry to address the aforementioned deficiencies and inadequacies with respect to reference leaks.

SUMMARY

In one embodiment, a reference leak includes a first substrate, a second substrate disposed on the first substrate, and a predetermined number of leak channels defined in at least one of the first and second substrates. Oblique walls of the leak channels are formed by crystal planes of the at least one of the first and second substrates.

A method for manufacturing a reference leak includes the steps of:

(a) providing a clean first substrate and a clean second substrate;

(b) forming a plurality of scores in at least one of the first and second substrates;

(c) forming a plurality of grooves in the at least one of the first and second substrates using each score as respective guide, oblique walls of the grooves being formed by crystal planes of the at least one of the first and second substrates; and (d) assembling the first and second substrates by a bonding method, a plurality of leak channels thereby defined therebetween to obtain a reference leak.

Other advantages and novel features of the present leak and method for making such will become more apparent from the following detailed description of preferred embodiments when taken in conjunction with the accompanying drawings.

BRIEF DESCRIPTION OF THE DRAWINGS

Many aspects of the present reference leak and method for making such can be better understood with reference to the following drawings. The components in the drawings are not necessarily to scale, the emphasis instead being placed upon clearly illustrating the principles of the present leak and method for making such. Moreover, in the drawings, like reference numerals designate corresponding parts throughout the several views.

The exemplifications set out herein illustrate at least one preferred embodiment of the present leak and method for making such, in one form, and such exemplifications are not to be construed as limiting the scope of the invention in any manner.

DETAILED DESCRIPTION

Reference will now be made to the drawings to describe embodiments of the present reference leak and a method for making such, in detail.

Figure 1:
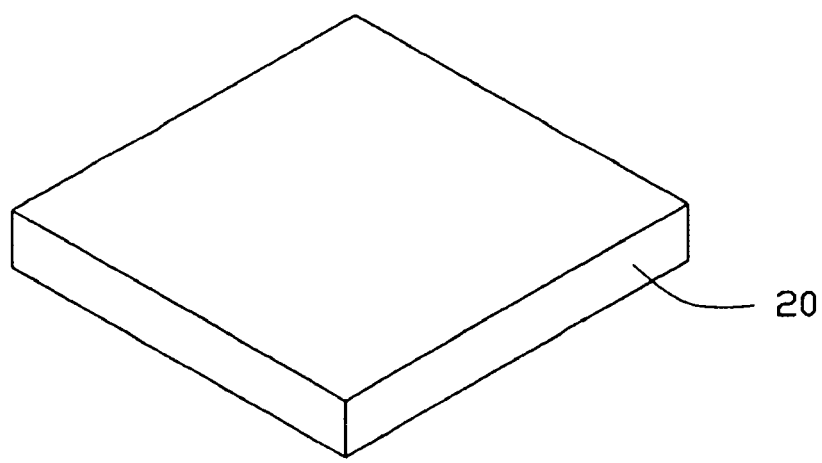
FIGS. 1-4 are schematic views showing successive stages in a process for making a reference leak, according to an exemplary embodiment of the present reference leak.
Figure 2:
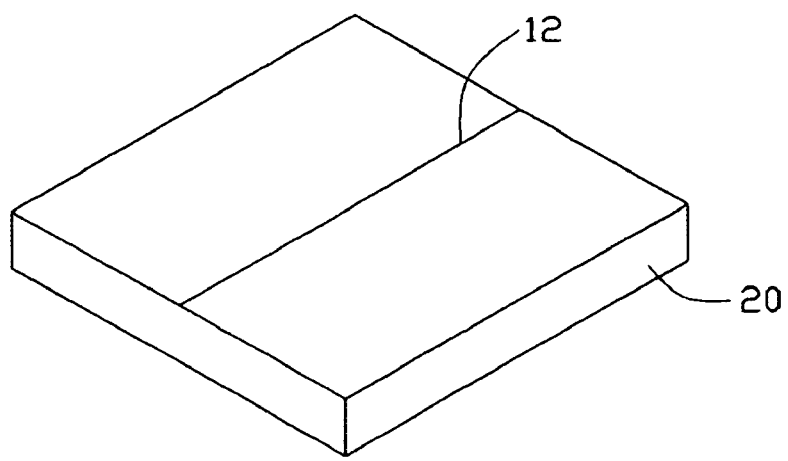
Figure 3:
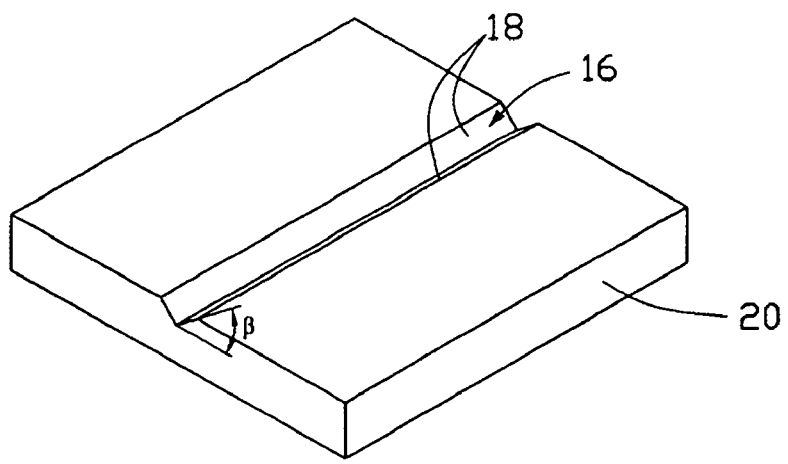
Figure 4:
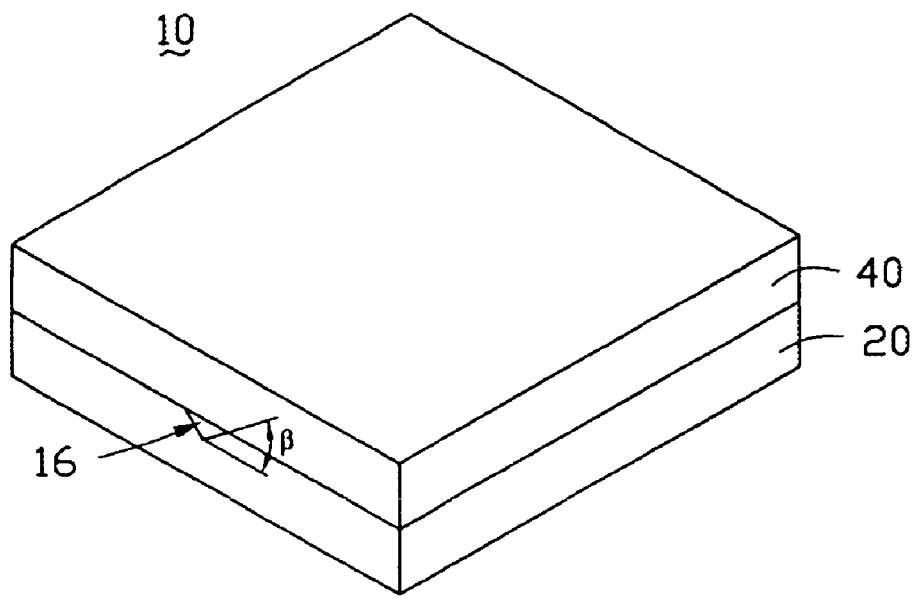
Figure 5:
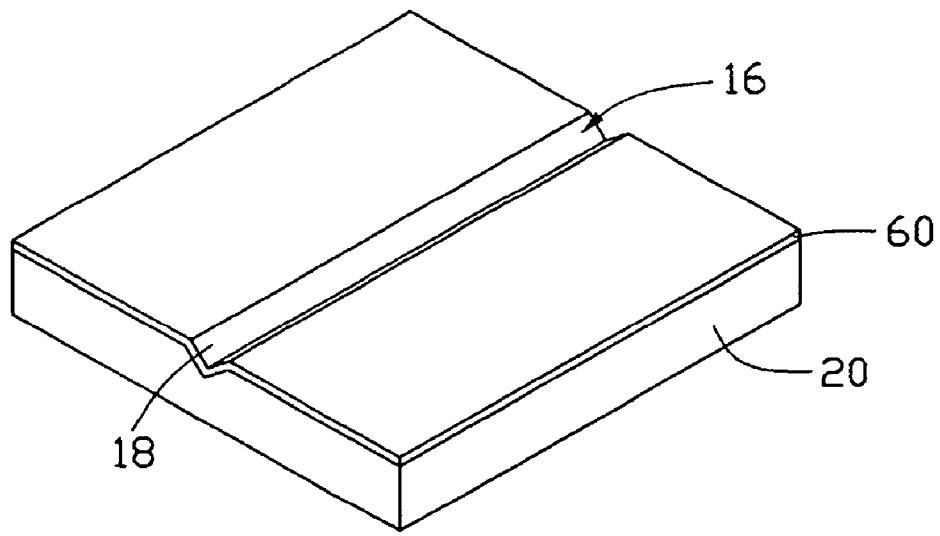
FIG. 5 is a schematic view of a first substrate of a reference leak in accordance with another embodiment of the present reference leak, showing a layer together with the first substrate.

Referring to FIGS. 4 and 5, a reference leak 10, in accordance with an exemplary embodiment, is shown. The reference leak 10 is generally used for, e.g., leak detection, periodic calibration of leak detectors such as helium mass spectrometers, measurement of pump speed of a micro vacuum pump, and supplying a microflow of gas in experiments in the field of gas-solid interface technology.

The reference leak 10 includes a first substrate 20, a second substrate 40 disposed and bonded on a top of the first substrate 20, and a plurality of leak channels 16 (only one shown in the FIG. 4) defined in the first and second substrates 20, 40. The leak channels 16 may be defined in at least one of the first and second substrates 20, 40. The cross sections of the leak channels 16 may be advantageously of a shape having at least mirror symmetry, such as an isosceles triangle or an isosceles trapezoid, in order to promote uniform gas flow therethrough.

In the illustrated embodiment shown in FIG. 4, the leak channels 16 are defined in a top portion of the first substrate 20 and the cross sections thereof are shaped as isosceles triangles.

The first substrate 20 is made from silicon, and a crystal plane orientation of the silicon is advantageously selected from (100) and (110) crystal plane orientations. Oblique walls 18 of the leak channels 16 are formed by crystal planes of the silicon of the first substrate 20. As shown in FIG. 4, an acute angle P of the oblique walls of each of the leak channels 16 is consistent with that of the crystal plane of the first substrate 20. The size of the leak channels 16 may be of a scale measured in nanometers.

Referring to FIGS. 1 through 4, the process for making the above-mentioned reference leak 10 is shown. The process generally includes the steps of:

(a) providing a clean first substrate 20, a crystal plane orientation of the silicon being preferably selected from (100) and (110) crystal plane orientations;

(b) forming a plurality of scores 12 (only one shown) in top portions of the first substrate 20;

(c) forming a plurality of grooves 16 (only one shown), using each score as respective guide, oblique walls 18 of the grooves 16 formed by crystal planes of the first substrate 20; and (d) bonding a clean second substrate 40 on the first substrate 20, a plurality of leak channels 16 (only one shown) thereby being defined between the first and second substrates 20, 40 to obtain a reference leak 10.

In the above step (b), the scores 12 are formed by, for example, a mechanical method, a photolithography method, or an electron beam etching method. The width of each of the scores 12 is preferably in the range from about 1 nm to about 100 μm, and the length of each of the scores 12 is substantially one hundred times the width of the grooves 16 formed in the above step (c). Each core serves as a guide for the formation of a respective groove.

In the above step (c), cross-sections of the grooves 16 may be advantageously of a shape having at least mirror symmetry, such as an isosceles triangle or an isosceles trapezoid. An acute angle β of oblique walls 18 is consistent with that of the crystal plane of the first substrate 20, thereby forming the oblique walls 18 of the grooves 16 in accordance with the crystal plane of the first substrate 20.

The grooves 16 are formed by an etching process. An etching agent, used in this process, is selected depending on the crystal plane orientations of the first substrate 20 and the etching rate thereof at a specific temperature. For example, at the temperature of 70° C., an alkaline liquor, containing 50% sodium hydroxide, has an etching rate of 0.0009 μm/min for (110) crystal plane orientations of the silicon and has an etching rate of 0.599 μm/min for (100) crystal plane orientations of the silicon. Alternatively, the grooves 16 are formed by, for example, a photolithography method, or an electron beam etching method.

The method of bonding the second substrate 40 and the first substrate 20 may be chosen in accordance with the composition of the surfaces to be bonded (not labeled) of the first and second substrates 20, 40. For example, if the bonding surfaces of the first and second substrates 20, 40 are made from metal, the bonding surfaces can be firstly melted and/or softened. Then, the second substrate 40 is placed onto the first substrate 20. The second substrate 40 bonds with the first substrate 20 during cooling of and/or under moderate pressure (e.g. 5-20 Pa). If the bonding surfaces of the first and second substrates 20, 40 are made from silicon, the first and second substrates 20, 40 are joined by an automated bonding method. In the automated bonding method, atomic bonds are firstly weakened between atoms of the bonding surfaces by, for example, pressing the first and second substrates 20, 40 in a vacuum case by a force as ten atmospheres. And/or the first and second substrates 20, 40 are to be placed under a high-voltage static condition. The first and second substrates 20, 40 are then placed in a high temperature to firm the atomic bonds, thereby the second substrate 40 bonding to the first substrate 20.

Referring to FIG. 5, in another embodiment of the present reference leak, portions of the first and second substrates 20, 40 near the leak channels 16 should be made from, or covered by, a material impervious to a gas to be detected by the reference leak 10. For example, if the reference leak 10 is utilized to detect helium (He) gas, then the first substrate 20 has a metal layer 60 formed on portions thereof near and on (broadly stated: proximate) the leak channels 16. The metal is preferably selected from the group consisting of copper, nickel, molybdenum, and alloys composed substantially of at least one of such metals. The second substrate 40 is advantageously made from a material selected from metal and silicon. If the second substrate 40 is made from silicon, the second substrate 40 has a metal layer 60 formed on portions thereof near and on (broadly stated: proximate) the leak channels 16. The metal is preferably selected from the group consisting of copper, nickel, molybdenum, and alloys composed substantially of at least one of such metals. If a reference leak 10 is utilized to detect air, oxygen gas or argon (Ar) gas, the first substrate 20 has an oxidized silicon layer 60 (e.g., $SiO_2$, $SiO_x$) formed on portions thereof near and on the leak channels 16, or the layer 60 may be omitted. The second substrate 40 is made from a material selected from oxide of silicon and silicon. If the second substrate 40 is made from silicon, the second substrate has an oxidized silicon layer 60 formed on portions thereof near and on the leak channels 16, or the layer 60 may be omitted. The addition of the layer 60 to either or both of the first substrate 20 and the second substrate 40 constitutes an additional step to be taken after step (c) above. The layer 60 formed on at least one of the first and second substrates 20, 40 is performed by, e.g., an evaporation deposition method, a sputtering deposition method, or an electroplating method.

The above-mentioned method is used for manufacturing a reference leak 10 having the leak channels 16 in the first substrate 20. It should be noted that in the present reference leak, that the leak channels 16 may be defined in either of both of the first and second substrates 20, 40. In the method for making such, the first and second substrates 20, 40 are also made from silicon, and a crystal plane orientation of the silicon is advantageously selected from (100) and (110) crystal plane orientations. The grooves 16 are formed in the first and second substrates 20, 40. Oblique walls 18 of the grooves 16 are formed by crystal planes of the silicon of the first and second substrates 20, 40. The selective layers 60 are formed on the first and second substrates 20, 40. When the first and second substrates 20, 40 are bonded together, the grooves 16 in the first and second substrates are able to communicate to form the regular shaped leak channels 16 to resultingly obtain the reference leak 10.

In the present reference leak 10, the number, shape, and size of the leak channels 16 thereof may be predetermined prior to making the reference leak 10 in accordance with various production and/or operating requirements. Otherwise, the leak channels 16 have substantially same size and are substantially parallel to each other. Therefore, leak ratio for leak detection and calibration of leak detectors can be calculated accurately.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

We claim:

1. A reference leak, the reference leak comprising:
   a first substrate;
   a second substrate disposed on a top of the first substrate; and
   a plurality of leak channels defined between the first substrate and the second substrate, the size of the leak channels is measured on a scale of nanometers, each leak channel including only one groove formed in one of the first and second substrates, each groove having oblique walls formed by crystal planes of a respective one of the first and second substrates, the reference leak having a first end surface and an opposite second end surface, and each groove extending through the reference leak from the first end surface to the second end surface;
   wherein the second substrate is made from an oxide of silicon or a metal selected from the group consisting of copper, nickel, molybdenum, and alloys composed of at least one of such metals.

2. The reference leak as claimed in claim 1, wherein the leak channels are defined in a top portion of the first substrate, and the first substrate is made from silicon.

3. The reference leak as claimed in claim 2, wherein the crystal plane orientation of the silicon for the first substrate is selected from one of a (100) crystal plane orientation and a (110) crystal plane orientation.

4. The reference leak as claimed in claim 3, wherein a selective layer is formed on portions of the first substrate near the leak channels.

5. The reference leak as claimed in claim 4, wherein the layer is made from one of a metal and an oxide of silicon, the metal being selected from the group consisting of copper, nickel, molybdenum, and alloys composed substantially of at least one of such metals.

6. The reference leak as claimed in claim 1, wherein a cross-section of each of the leak channels may be of a shape having mirror symmetry.

7. The reference leak as claimed in claim 1, wherein the plurality of leak channels are substantially parallel to each other, and each of the plurality of leak channels have a substantially same size.

8. A reference leak for use in detection of gas leaks in vacuum, the reference leak comprising:
   a top substrate having a bottom surface; and
   a bottom substrate having a top surface attached to the bottom surface of the top substrate, wherein at least one of the bottom surface of the top substrate and the top surface of the bottom substrate defines a plurality of grooves such that the top substrate and the bottom substrate cooperatively define a plurality of channels;
   wherein at least one of the top substrate and the bottom substrate is made from a metal or an oxide of silicon, and the detected gas is helium, air, oxygen, or argon.

9. The reference leak as claimed in claim 8, wherein the channels are substantially parallel to each other, and each of the channels have a substantially same size.

10. The reference leak as claimed in claim 8, wherein the gas is helium gas; the bottom substrate has a metal layer formed on portions thereof near and on the channels; the top substrate is made of metal.

11. The reference leak as claimed in claim 10, wherein the metal is selected from the group consisting of copper, nickel, molybdenum, and alloys composed substantially of at least one of such metals.

12. The reference leak as claimed in claim 8, wherein the gas is air, oxygen gas, or argon gas; the bottom substrate has an oxidized silicon layer formed on portions thereof near and on the channels; the top substrate is made of oxidized silicon.

13. The reference leak as claimed in claim 8, wherein the gas is air, oxygen gas, or argon gas; the bottom substrate has an oxidized silicon layer formed on portions thereof near and on the channels; the top substrate is made of silicon, the top substrate has an oxidized silicon layer formed on portions thereof near and on the channels.

14. A reference leak for use in detection of gas leaks in vacuum, the reference leak comprising:
    a top substrate having a bottom surface; and
    a bottom substrate having a top surface attached to the bottom surface of the top substrate, wherein at least one of the bottom surface of the top substrate and the top surface of the bottom substrate defines a plurality of grooves such that the top substrate and the bottom substrate cooperatively define a plurality of channels;
    wherein at least one of the top substrate and the bottom substrate has a metal layer or an oxidized silicon layer formed on portions thereof near and on the channels, and the detected gas is helium, air, oxygen, or argon.

15. The reference leak as claimed in claim 14, wherein the channels are substantially parallel to each other, and each of the channels have a substantially same size.

16. The reference leak as claimed in claim 14, wherein the gas is helium gas; the bottom substrate has a metal layer formed on portions thereof near and on the channels; the top substrate is made of silicon, the second substrate has a metal layer formed on portions thereof near and on the channels.

17. The reference leak as claimed in claim 16, wherein the metal is selected from the group consisting of copper, nickel, molybdenum, and alloys composed substantially of at least one of such metals.

18. The reference leak as claimed in claim 14, wherein the gas is air, oxygen gas or argon gas; the bottom substrate has an oxidized silicon layer formed on portions thereof near and on the channels; the top substrate is made of silicon, the top substrate has an oxidized silicon layer formed on portions thereof near and on the channels.

* * * * *